United States Patent
Sen et al.

(10) Patent No.: US 9,733,088 B2
(45) Date of Patent: Aug. 15, 2017

(54) SIGNAL SPACE BASED NAVIGATION

(71) Applicant: HEWLETT PACKARD ENTERPRISE DEVELOPMENT LP, Houston, TX (US)

(72) Inventors: Souvik Sen, Palo Alto, CA (US); Kyu Han Kim, Palo Alto, CA (US); Jindan Zhu, Davis, CA (US); Prasant Mohapatra, US Davis, CA (US)

(73) Assignees: Hewlett Packard Enterprise Development LP, Houston, TX (US); Regents of University of California, Oakland, CA (US)

( * ) Notice: Subject to any disclaimer, the term of this patent is extended or adjusted under 35 U.S.C. 154(b) by 0 days.

(21) Appl. No.: 15/032,060

(22) PCT Filed: Oct. 30, 2013

(86) PCT No.: PCT/US2013/067532
§ 371 (c)(1),
(2) Date: Apr. 26, 2016

(87) PCT Pub. No.: WO2015/065375
PCT Pub. Date: May 7, 2015

(65) Prior Publication Data
US 2016/0265918 A1  Sep. 15, 2016

(51) Int. Cl.
*G01S 19/48* (2010.01)
*G01C 21/14* (2006.01)
(Continued)

(52) U.S. Cl.
CPC ......... *G01C 21/14* (2013.01); *G01C 21/206* (2013.01); *G01S 1/08* (2013.01); *G01S 5/0252* (2013.01);
(Continued)

(58) Field of Classification Search
CPC ..... G01S 5/0252; G01S 19/48; G01C 21/206; G01C 17/38; G01C 21/30; G01C 11/02;
(Continued)

(56) References Cited

U.S. PATENT DOCUMENTS

| 5,394,333 A * | 2/1995 | Kao ................ G01C 21/30 340/990 |
| 6,768,813 B1 * | 7/2004 | Nakayama ............ G01C 11/02 345/419 |

(Continued)

FOREIGN PATENT DOCUMENTS

| KR | 10-2008-0111789 A | 12/2008 |
| KR | 10-2012-0136585 A1 | 12/2012 |

(Continued)

OTHER PUBLICATIONS

Anshul Rai et al., "Zee: Zero-Effort Crowdsourcing for Indoor Localization," Mobicom '12, 2012, Aug. 22-26, 2012, Istanbul, Turkey, pp. 293-304, ACM.

(Continued)

*Primary Examiner* — Yuri Kan
(74) *Attorney, Agent, or Firm* — Mannava & Kang (57) ABSTRACT

According to an example, a signal space based navigation apparatus may receive traces of wireless signal observations and corresponding pedestrian deadreckoning (PDR) traces between different ones of the wireless signal observations from a plurality of user devices. A plurality of wireless clusters may be generated based on the traces of wireless signal observations. A PDR displacement vector may be generated between two or more of the wireless clusters based on the two or more of the wireless clusters and a subset of the PDR traces corresponding to the two or more of the wireless clusters. A sensing map may be generated based on the plurality of wireless clusters and a plurality of
(Continued)

PDR displacement vectors including the PDR displacement vector.

20 Claims, 9 Drawing Sheets (51) Int. Cl.
- G01S 1/08 (2006.01)
- G01S 5/02 (2010.01)
- H04W 4/04 (2009.01)
- G01C 21/20 (2006.01)
- H04W 4/02 (2009.01)
- H04W 84/12 (2009.01)

(52) U.S. Cl.
CPC ........... *G01S 5/0263* (2013.01); *H04W 4/043* (2013.01); *H04W 4/027* (2013.01); *H04W 84/12* (2013.01)

(58) Field of Classification Search
CPC .... G01C 21/005; G01C 21/20; G01C 21/165; G06F 3/0346
See application file for complete search history.

(56) References Cited

U.S. PATENT DOCUMENTS

| | | | |
|---|---|---|---|
| 8,320,939 B1* | 11/2012 | Vincent | G01S 19/48 370/338 |
| 8,965,688 B2* | 2/2015 | Bandyopadhyay | G01C 17/38 701/1 |
| 2010/0245174 A1* | 9/2010 | Okuyama | G01C 21/165 342/451 |
| 2012/0072106 A1* | 3/2012 | Han | G01C 21/206 701/410 |
| 2012/0144076 A1* | 6/2012 | Yang | G06F 3/0346 710/63 |
| 2012/0244889 A1* | 9/2012 | Nomachi | G01C 21/20 455/457 |
| 2013/0170383 A1 | 7/2013 | Cho et al. | |
| 2013/0172010 A1 | 7/2013 | Kang et al. | |
| 2013/0311084 A1* | 11/2013 | Lundquist | G01C 21/005 701/430 |

FOREIGN PATENT DOCUMENTS

| | | |
|---|---|---|
| WO | WO-2013/055959 A1 | 4/2013 |
| WO | WO-2013/057730 A1 | 4/2013 |

OTHER PUBLICATIONS

Fan Li et al., "A Reliable and Accurate Indoor Localization Method Using Phone Inertial Sensors," UbiComp'12, Sep. 5-8, 2012, Pittsburgh, PA, USA, pp. 1-10, ACM.

Guobin Shen et al., "Walkie-Markie: Indoor Pathway Mapping Made Easy," NSDI'13, 2013, pp. 85-98, ACM.

He Wang et al., "No Need to War-Drive Unsupervised Indoor Localization," MobiSys '12, Jun. 25-29, 2012, Low Wood Bay, Lake District, UK, pp. 197-210, ACM.

Hyojeong Shin et al., "FindingMiMo: Tracing a Missing Mobile Phone Using Daily Observations," MobiSys '11, Jun. 28-Jul. 1, 2011; Bethesda, Maryland, USA, pp. 29-42, ACM.

Hyojeong Shin et al., "Unsupervised Construction of an Indoor Floor Plan Using a Smartphone," IEEE Transactions on Systems, Man, and Cybernetics—Part C: Applications and Reviews, Nov. 2012, pp. 889-898, vol. 42, No. 6, IEEE.

International Search Report and Written Opinion, International Application No. PCT/US2013/067532, Date: Jul. 28, 2014, pp. 1-9.

Ionut Constandache et al., "Did You See Bob?: Human Localization using Mobile Phones," MobiCom '10, Sep. 20-24, 2010, Chicago, Illinois, USA, pp. 149-160, ACM.

Ubejd Shala and Angel Rodriguez, "Indoor Positioning Using Sensor-fusion in Android Devices," Sep. 2011, pp. 1-58, Kristianstad University, Sweden.

Zheng Yang et al., "Locating in Fingerprint Space: Wireless Indoor Localization with Little Human Intervention," Mobicom '12, Aug. 22-26, 2012, Istanbul, Turkey, pp. 269-280, ACM.

* cited by examiner

SIGNAL SPACE BASED NAVIGATION

BACKGROUND

Navigation through a space typically includes controlling the movement of a subject (e.g., a person, or another object) from one location to another. Compared to localization, which typically includes positioning a subject in a physical or geographic space, navigation is generally concerned with movement of the subject. Navigation systems are typically built upon an operational localization system. In this context, movement of a subject becomes subordinate to and is regulated and inferred from the geographic layout provided in the localization system.

A localization system typically includes a localization map that binds observations in a sensing space to their corresponding geographic locations. Building a localization map can be challenging, for example, due to the lack of a priori knowledge about the sensing space and geographic locations. Techniques to generate a localization map often need knowledge of the geographic locations and continuous sensing of the sensing space. Further, binding observations in the sensing space to their corresponding geographic locations can be error-prone or need user intervention to correct any errors and/or confirm the binding. The foregoing aspects can add challenges and complexities to implementation of a localization system, and thus a navigation system built upon the localization system.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Navigation systems are typically built upon an operational localization system that includes a localization map. However, as disclosed herein, a navigation system may be constructed by instead using a topological sensing map in sensing space. As described in further detail below, a signal space based navigation apparatus and a method for signal space based navigation are disclosed herein, and may generally provide a navigation system that alleviates the need for constructing a localization map. The sensing map disclosed herein may include nodes (e.g., wireless signal based clusters generally, including WiFi clusters according to examples disclosed herein) that include a set of sensing observations that are connected by edges (i.e., pedestrian deadreckoning (PDR) displacement vectors as described below) representing mobility information between consecutive collections of observations. Sensing observations of starting points and destinations may be obtained and located on the sensing map, and by following the mobility information paths between them, a user (e.g., a subject) may be navigated from a starting point through a sequence of intermediate observation nodes to reach the destination.

The construction of the sensing map as disclosed herein may be based on the premise that a geographic layout used for navigation may be preserved by mobility information encoded as a PDR displacement vector between sensing observations and translated into instructions. For example, the instructions may indicate for a user to walk forward for ten meters to the second turn in front, and turn right. Further, the construction of the sensing map as disclosed herein may be based on the premise that sensing observations may be statistically correlated with geographic locations (e.g., a particular grocery store, clothing store, etc.). Therefore any location may be represented by sensing observations sharing a certain level of similarity. Locations may include a turn that may suggest a change in mobility, which may be detected by using energy-efficient inertia sensors, such as an accelerometer. A turn may also be used to divide a complex mobility path into multiple segments in which mobility is relatively uniform. Compared to a localization map, the sensing map disclosed herein may assume no a priori knowledge about the geographic space. For example, for the sensing map disclosed herein, locations may be represented by sensing observations and a geographical layout may be inferred from sensed mobility traces (i.e., PDR traces). The use of the sensing map disclosed herein may therefore avoid challenges associated with localizing and extending a localization map based on an inaccurate localization map and its resulting accumulative error. A navigation task may therefore be performed independently from any issues and/or complexities associated with an underlying localization system.

According to an example, the sensing map disclosed herein may be based on traces that include wireless signal observations and corresponding PDR traces of accelerometer and magnetometer readings, for example, from users' mobile devices. According to particular examples disclosed herein, the wireless signal observations may include WiFi signal observations. Further, according to particular examples disclosed herein, the traces may include crowd-sourced traces of wireless signal observations and corresponding PDR traces. The wireless signal observations may be used to mark different locations but without the need for annotations. A PDR trace between two wireless signal observations may record mobility information in terms of distance and direction from one place where the wireless signal observation is taken to another. The collection of both wireless signal observations and PDR traces may be crowd-sourced to ordinary users as they carry a mobile device and walk around a space. Thus, the collection of both wireless signal observations and PDR traces may be non-intrusive and autonomous to users. Collected samples of the wireless signal observations and PDR traces may be sent as traces to the signal space based navigation apparatus for analysis and compilation into a sensing map.

The signal space based navigation apparatus and the method for signal space based navigation disclosed herein may thus provide for the separation of a navigation task from a localization task through the construction of a sensing map that includes wireless signal observations in the form of wireless clusters and PDR mobility information in the form of PDR displacement vectors connecting the wireless clusters. The apparatus and method disclosed herein may also use turn-aware crowd-sourcing data collection (e.g., the traces), density-based wireless observation clustering to generate the wireless clusters, and PDR displacement estimation to generate the PDR displacement vectors, to thus facilitate the accurate and efficient construction of the sensing map. For the sensing map disclosed herein, landmarks may be extracted in parallel from the traces by employing a clustering technique that exploits signal similarity and stability at locations of the wireless signal observations. Further, relative locations of the wireless clusters may be preserved by fusing the PDR traces to generate the PDR displacement vectors. For the sensing map disclosed herein, change of mobility pattern at turns may be detected through a low-power accelerometer, which may further function as a trigger for proactive wireless signal observations at turns to thus improve both wireless clustering and power efficiency of user devices.

With respect to wireless signal observation and PDR traces, signal fluctuation may contribute to a relatively large part of localization error for wireless signal observations, which may be amplified by diverse signal quality from crowd-sourcing due to diversity or placement of devices (e.g., smartphones) for different users. Tracking based on PDR traces may have a tendency of drifting away from an actual trajectory as the tracking prolongs. These factors may be addressed by using a density-based clustering process on the wireless signal observations. The wireless signal observations may be grouped together if they share a pre-set (i.e., predetermined) level of signal similarity and implied geographical closeness. Otherwise, the wireless signal observations may be treated as noise until further data is available. The dynamics of wireless clusters may evolve and shift as available amount of data increases, improving the ability of wireless clusters to accurately represent corresponding locations. Multiple wireless clusters may also be used to represent a location to capture the nature of signal fluctuation. A PDR trace connecting two wireless clusters may create a mobility path connecting the wireless clusters. Multiple such mobility paths existing between two wireless clusters may be fused into a single path for reducing measurement errors. The severity of PDR trace drifting may be minimized by disregarding relative displacement connecting two wireless clusters.

The aspect of crowd-sourcing may also impose challenges related to trade-off between data efficiency and energy consumption. To reduce the use of energy-intensive sensors, such as a wireless radio, the signal space based navigation apparatus and the method for signal space based navigation disclosed herein may rely on low-power accelerometers in user devices to detect physical turns made by users of the respective user devices. In typical user devices, such accelerometers are maintained in an always-on configuration. The apparatus and method disclosed herein may also use wireless modules and magnetometers in the user devices to respectively perform wireless scanning and direction assessment at a higher sampling rate at turn locations. Otherwise, the apparatus and method disclosed herein may switch to a relatively lower sampling rate at non-turn locations for minimizing power usage of the user devices. Compared to general locations (i.e., non-turn locations), a turn includes a geographic feature embodied therein that allows the turn to serve as a pivot point in a path and to provide the user a useful visual clue for compensating for relatively small errors. For the apparatus and method disclosed herein, as discussed herein, additional wireless signal observations (e.g., wireless signal observations at a higher sampling rate) may be collected at turns to improve wireless clustering accuracy, and to provide a higher probability of finding a mobility path connecting turns.

Figure 1:
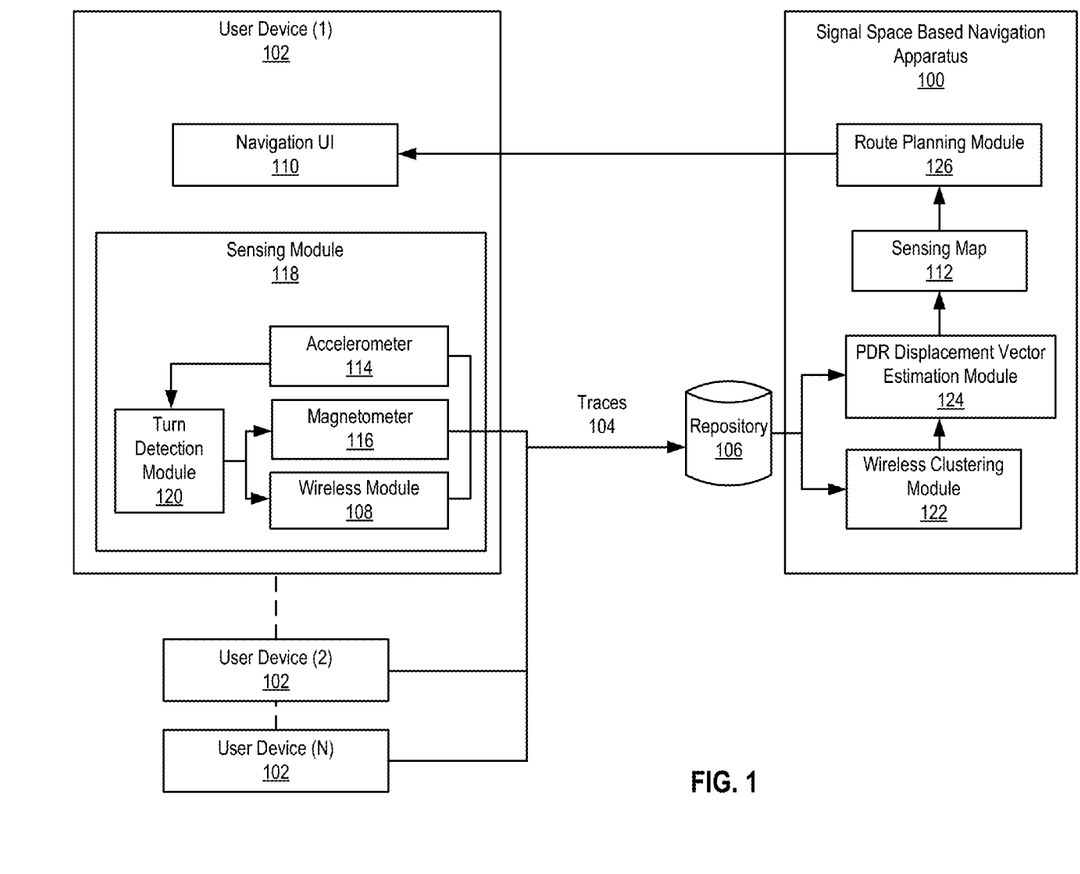
FIG. 1 illustrates an environment including a signal space based navigation apparatus usable with user devices to receive traces, according to an example of the present disclosure.

FIG. 1 illustrates an environment including a signal space based navigation apparatus 100 usable with user devices 102 (1-N) (hereinafter "user devices 102") to receive traces 104 from the user devices 102, according to an example of the present disclosure. The signal space based navigation apparatus 100 may include a computer and other relevant components for implementing the modules disclosed herein. A repository 106 may be disposed between the user devices 102 and the signal space based navigation apparatus 100 to receive the traces 104, and to provide the traces 104 to the signal space based navigation apparatus 100. The user devices 102 may be devices such as smartphones, tablets, and generally, any mobile devices users may use or carry. The user devices 102 may ascertain the wireless signal observations via a wireless module 108 and submit the wireless signal observations as part of the traces 104 to the signal space based navigation apparatus 100. The user devices 102 may further include a navigation user interface (UI) 110 to facilitate navigation of a user of the respective user device 102.

The signal space based navigation apparatus 100 may process the traces 104 into a sensing map 112 for navigation and use by the navigation UI 110. Generally, the user devices 102 may sense the users' mobility and environment. For example, when a user walks naturally around a space, the user device 102 for the respective user may track movement by monitoring acceleration and walking direction as detected by an accelerometer 114 and magnetometer 116, respectively, of a sensing module 118. The user devices 102 may also periodically (i.e., at a predetermined sampling rate) trigger wireless scans by using the wireless module 108 to sense the signal space. With respect to turns in navigation, the user devices 102 may actively collect wireless signal observations at turn locations as detected by a turn detection module 120 of the sensing module 118 to identify turns, for example, by capturing acceleration changes when a user makes a turn. When a turn is detected, the user devices 102 may simultaneously trigger the wireless module 108 and magnetometer 116, respectively, to collect wireless signal observations and change of direction at the turn location at a higher sampling rate. For remaining periods (e.g., at non-turn locations), wireless scanning and magnetometer readings may operate at a relatively lower sampling rate to substantially minimize power consumption of the user devices 102.

The signal space based navigation apparatus 100 may receive data (e.g., the traces 104) collected by all participating users at the repository 106. The signal space based navigation apparatus 100 may include a wireless clustering module 122, a PDR displacement vector estimation module 124, and a route planning module 126 to identify common wireless signal observations and their relative positions from the traces 104. Generally, the wireless clustering module 122 may perform a density-based clustering over the traces 104 to extract similar wireless signal observations encountered by different users during their walks, for example, at the same turn the users passed through. For the identified wireless clusters, the PDR displacement vector estimation module 124 may calculate the relative positions of the wireless clusters by identifying and fusing all PDR traces that connect the wireless clusters.

The sensing map 112, which includes wireless clusters and PDR displacement vectors, may be ready for the route planning module 126 to serve a navigation request, for example, by the navigation UI 110. With respect to the sensing map 112, both source and destination locations may be described as wireless signal observations obtained from the scanning performed by the user devices 102, and associated respectively to wireless clusters with closest signal similarity, by the route planning module 126. The route planning module 126 may determine a viable route between source and destination wireless clusters by selecting a number of intermediate clusters and their connecting PDR displacement vectors. A user may be navigated by following instructions translated from the generated route via the navigation UI 110.

As described herein, the modules and other elements of the apparatus 100 may be machine readable instructions stored on a non-transitory computer readable medium. In addition, or alternatively, the modules and other elements of the apparatus 100 may be hardware or a combination of machine readable instructions and hardware.

Figure 2:
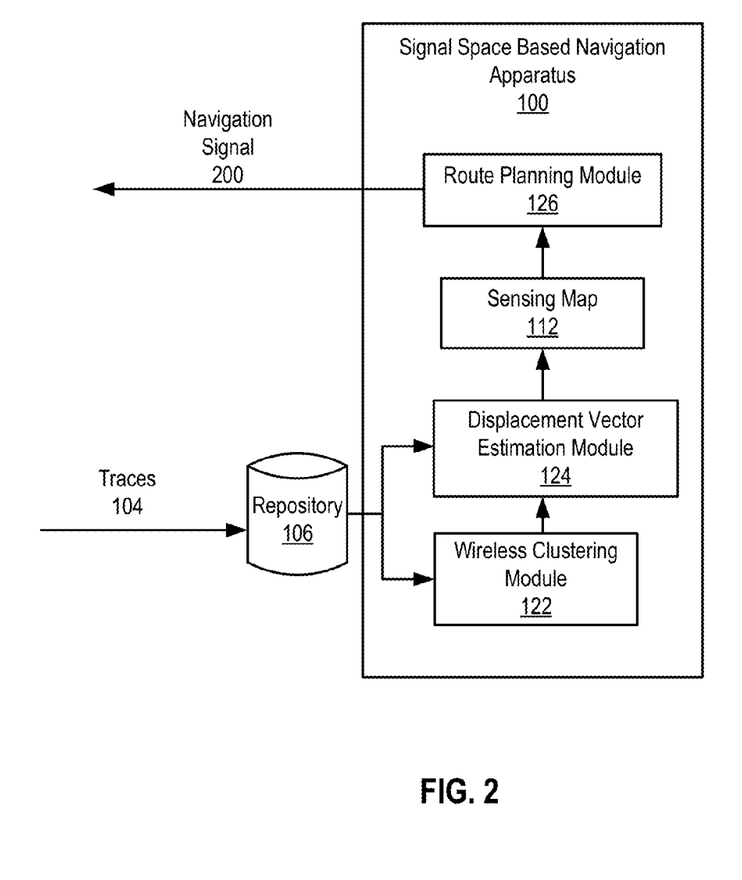
FIG. 2 illustrates an architecture of the signal space based navigation apparatus, according to an example of the present disclosure.

FIG. 2 illustrates the architecture of the signal space based navigation apparatus 100, according to an example of the present disclosure. In the example of FIG. 2, the signal space based navigation apparatus 100 may receive the traces 104, for example, from the user devices 102, and output a navigation signal 200. Referring to FIGS. 1 and 2, the navigation signal 200 may be sent, for example, to the navigation UI 110 of the user devices 102. Alternatively or additionally, the navigation signal 200 may be sent to any other device to facilitate navigation using the sensing map 112 and route planning module 126 of the signal space based navigation apparatus 100.

Referring to FIGS. 1-4, the turn detection module 120, according to an example, is described.

With respect to the turn detection module 120, a turn location may provide for navigation and sensing. Generally, indoor environments maintain a layout including open spaces and structured pathways. A navigation task that entails finding a pathway connecting two spaces may be restated as finding a series of path segments pivoting at turns. Users generally understand turn-by-turn instructions given clues from perceived surrounding layout. Alternatively, movements within each path segment may be constrained by the structure of the path segment (e.g., walls), which may facilitate accurate extractions from any noisy and undersampled inertia sensor traces (e.g., traces from the accelerometer 114). At turns however, mobility may change and exhibit a pattern in acceleration, which may be detected by the accelerometer 114. Based on the foregoing factors, the sensing map 112 may be constructed based on a skeleton network of turns, in accordance with the nature of navigation. Compared to general locations, wireless signal observations may be collected at a higher sampling rate at turn locations in order to increase the effectiveness of finding corresponding wireless clusters and the number of connecting PDR segments (i.e., PDR displacement vectors).

In order for the sensing module 118 to detect turns in an energy-efficient and accurate manner, the use of high power sensors in the user devices 102 may be minimized by using the accelerometer 114. In a general user device 102, such as a smartphone, the accelerometer 114 may be configured to be always-on for supporting other applications on the user device 102. The accelerometer 114 may be a three-axis accelerometer to detect acceleration of sideways, forward, and upward movements. Assuming no orientation change of the user device 102 with respect to a user walking direction, a turn movement may be divided into a sequence of consecutive linear accelerations along an axis pointing at the turn direction. Such linear accelerations result in the observation of escalated and prolonged sideways accelerations of the user devices 102 to facilitate differentiation of a turn pattern from a general acceleration based on walking with alternate legs.

Figure 3:
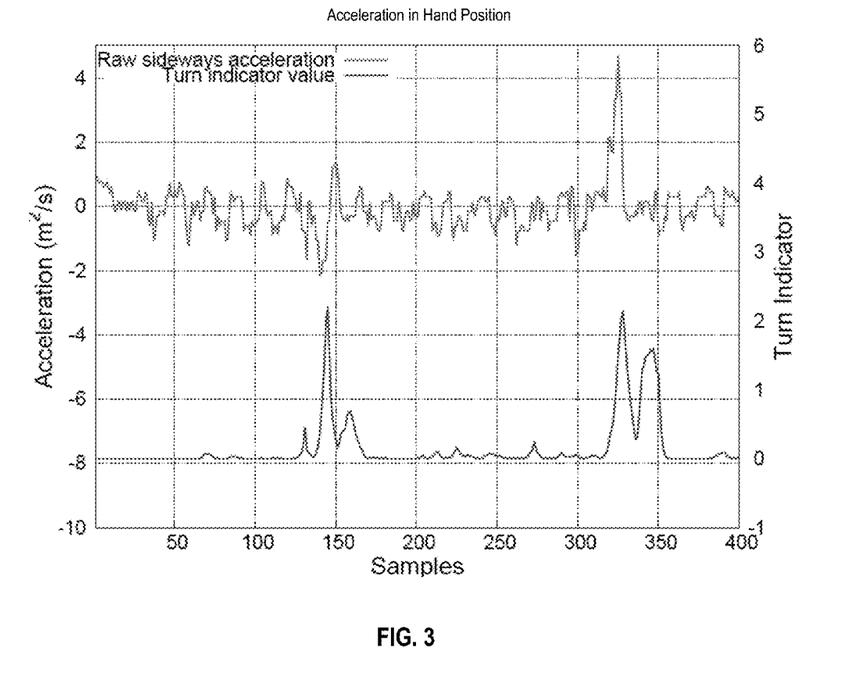
FIG. 3 illustrates an example of acceleration in a hand position for a user device used with the signal space based navigation apparatus of FIGS. 1 and 2, according to an example of the present disclosure.
Figure 4:
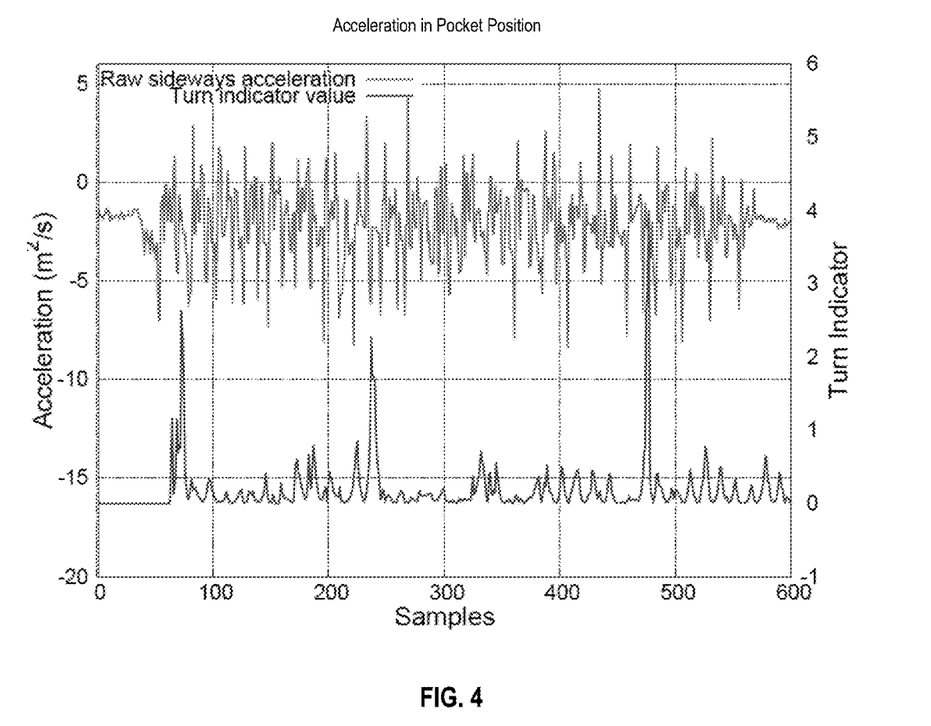
FIG. 4 illustrates an example of acceleration in a pant pocket position for the user device used with the signal space based navigation apparatus of FIGS. 1 and 2, according to an example of the present disclosure.

FIG. 3 illustrates an example of acceleration in a hand position for the user device 102 (e.g., one of the user devices 102) used with the signal space based navigation apparatus 100 and FIG. 4 illustrates an example of acceleration in a pocket position (e.g., a user's pants pocket) for the user device 102, according to examples of the present disclosure. For FIGS. 3 and 4, the upper traces may illustrate acceleration collected at the accelerometer 114, and the lower traces may illustrate results after processing by the turn detection module 120. With respect to differentiation of a turn pattern from a general walking acceleration, the examples of FIGS. 3 and 4 illustrate two turns in each trace, a left turn followed by a right turn. As shown in FIGS. 3 and 4, it can be seen from the raw sideways acceleration at approximately 145 and 325 samples of FIG. 3, and at approximately 240 and 475 samples of FIG. 4 that the trend of sideways movement is visible in terms of both magnitude and duration for FIG. 3, but not clearly evident for FIG. 4. This is because when the user device 102 is placed in a pant pocket of a user, the movement of the user device 102 may be influenced by the global body movement of a user carrying the user device 102 and further augmented by the rotational movement of legs, which creates sideways acceleration with similar magnitude. In FIG. 3, it can be seen that the turn detection module 120 accurately captures both turns as shown in the turn indicator trace (i.e., lower trace). Further, in FIG. 4, the turn indicator amplitude at approximately 75 samples may represent a starting movement of a user, whereas the acceleration at approximately 240 and 475 samples may represent turns.

With respect to detection of turns, due to the ambiguity of orientation of the user device 102 being a prerequisite for determining which axis of acceleration corresponds to a given direction of movement, the turn detection module 120 may determine axis-to-movement association as follows. The turn detection module 120 may take trace segments of a preset length (i.e., fast Fourier transform (FFT) window)

from three axes, and convert the trace segments respectively to energy spectrum using FFT. The axis that produces the largest direct current (DC) component may be associated with up-down movement, since this axis is influenced the most by gravity. The turn detection module 120 may further search through the spectrum of identified up-down axis, and locate the frequency at which maximum energy is observed. This frequency may be denoted as a steps frequency because it reflects the repetitive pattern of walking for a user. The forward-backward movement may coincide with the same repetitive pattern, and may therefore normally have its maximum energy component observed at the same frequency. The axis that has the smallest energy at this frequency among the three axes may be designated as the sideways axis. As a result, an association between the coordinate system of the user device 102 and the coordinate system used to describe a walking direction may be created. This association may be checked on a per-sample basis. If association changes are reported, for example, three consecutive times, the turn detection module 120 may determine that a change of association has occurred and wait for a predetermined amount of samples to update to a new association. Any turn detected during this period may be discarded until a new association is confirmed.

With respect to the pant pocket scenario of FIG. 4, in order to detect turns from any noisy sideways acceleration traces, the turn detection module 120 may isolate acceleration caused by turning from other causes of interfering movements. Generally, interference may be associated with alternate leg movements which have a particular frequency complying with the up-down movement of steps. In order to reduce the interference level, a sideways trace segment of a predetermined length may be fed into a low-pass filter of the turn detection module 120 with threshold frequency set to the steps frequency of a general user. The filtered trace segment may be smoothened by a moving average sliding window for reducing noise from spontaneous random movements of the user device 102. When a turn occurs, among the samples at the tail of the smoothened window, a large variance may be observed, for example, compared to samples at the beginning of the smoothened window.

Accordingly, two deviation windows may be applied for samples at the head and the tail, respectively, of the smoothened window, and may define a turn indicator value as the product of the standard deviation of the head window and the ratio of head deviation over tail deviation. In addition, the turn indicator value may be normalized with the square root of the root mean square of the trace segment. Thus, the turn indicator value may be used to detect irregular sideways acceleration that likely indicates a turn. According to an example, a threshold approach may be applied so that if a normalized turn indicator exceeds the threshold, the turn detection module 120 reports a turn. By way of a particular example, the threshold may be selected at 1.5. This relatively low threshold value may provide for limiting turn detection misses, and minimizing false turn positives. In order to address false turn indications, every time a turn is reported based on a trace from the accelerometer 114, the turn detection module 120 may take samples from a compass and gyroscope (i.e., the magnetometer 116) from the user device 102, and may further evaluate recent direction history to confirm turns. Further, the wireless module 108 may be activated (or additional wireless signal observations may be taken) if a change in compass and gyroscope readings agrees with turns detected by the accelerometer 114.

Referring to FIG. 1, the wireless module 108 and the wireless clustering module 122, according to an example, are described.

The wireless clustering module 122 may ascertain similar wireless signal observations collected by the wireless module 108 at common locations where user trajectories overlap or intersect and may congregate the similar wireless signal observations into wireless clusters. The wireless clusters may form the endpoints for potential PDR segment fusion. A wireless cluster may satisfy a first condition of being confined within a compact area with respect to both signal coverage and physical coverage. Wireless signal observations in a formed wireless cluster may be close to each other in signal space according to a signal to distance threshold used for clustering. Further, wireless signal observations in a formed wireless cluster may also be close to each other in physical space so that one wireless cluster may be used to pinpoint a unique location to provide for increased accuracy. A wireless cluster may satisfy a second condition of including a sufficiently dense wireless signal observation membership so that the wireless cluster is stable and will not be readily swayed by a few undetected outlier wireless signal observations. Thus, a wireless cluster may need sufficient data from the same or multiple wireless signal observations to support the forming of a wireless cluster.

The wireless clustering module 122 may use a density-based clustering process to create wireless clusters corresponding to such common locations in the traces 104. For example, the wireless clustering module 122 may use a density-based spatial clustering of applications with noise (DBSCAN) process. The density-based clustering may include a first property including the concept of noise that provides for arbitrary shape of clusters, and the consideration of neighbor density in addition to cluster member distance (i.e., distance of wireless signal observations). The wireless clustering module 122 may also use an expulsion process to prevent wireless clusters from occasional overgrowing, and to allow wireless clusters to evolve over time and to improve quality of the dataset including the traces 104.

With respect to wireless signal observations and signal distance, for wireless signal observations collected by crowd-sourcing participants (i.e., users of the user devices 102), a typical wireless scan by the user device 102 may last less than one second, which may be less than the time needed to complete a full scan. Further, users may be assumed to be mobile when performing the scanning. In an environment where channel diversity is high, individual scans may generally sense a partial list of surrounding access points (APs), and such mismatch in partial AP lists may introduce a penalty that distorts the signal distance calculation. For the wireless module 108, each time a wireless scan is activated, the wireless module 108 may perform multiple (e.g., three) consecutive scans at once. Results from the multiple scans may be assembled to compose one wireless signal observation. Throughout the scans, the wireless module 108 may average multiple received signal strength indicators (RSSIs) from the same AP. Further, for each AP, the wireless module 108 may record its number of occurrences for subsequent use as a weighted factor. Based on the foregoing aspects, the wireless module 108 may improve the chance of sensing a more comprehensive list of APs.

The wireless clustering module 122 may use a distance metric to estimate similarity between two aggregated wireless signal observations. The wireless clustering module 122 may define signal distance SD(i, j) between wireless signal observations $obs_i$ and $obs_j$ as follows:

$$SD(i,j) = \sqrt{\sum_{n=1}^{N}(w_n * (RSSI_n^i - RSSI_n^j)^2)/C} \quad \text{Equation (1)}$$

For Equation (1), $RSSI_n^i$ may represent signal strength of $AP_n$ in $obs_j$, and if $AP_n$ is not present in one of the wireless signal observations, the strength of the $AP_n$ may be replaced by a value, for example, −95 dBm. For Equation (1), $w_n$ may represent a weighted factor to account for the stability of the $AP_n$ during the scanning. The weighted factor $w_n$ may be set to one if $AP_n$ appears in both wireless signal observations, and the occurrence count of $AP_n$ may be divided by three if $AP_n$ appears in one wireless signal observation. For Equation (1), C may denote the number of APs present in both wireless signal observations, and N may denote the total number of $AP_s$ present in either wireless signal observation.

The wireless clustering module 122 may perform intertrace clustering by using a DBSCAN process to control the wireless clustering process through two parameters, a distance threshold ϵ-distance and a density threshold minPts. Wireless signal observations with signal distance less than the ϵ-distance to a given wireless signal observation may be included in the ϵ-neighborhood of the given wireless signal observation. When member size of one wireless signal observation's ϵ-neighborhood reaches minPts, the wireless signal observation may become a core. The wireless clustering module 122 may define that wireless signal observation $obs_p$ as being density reachable from core $obs_q$ if there is a chain of cores between them. Furthermore, if two wireless signal observations are density-reachable from a same core, these wireless signal observations may be designated as density connected. To find a wireless cluster, the wireless clustering module 122 may iteratively search the space from a core until a maximal set of density-connected wireless signal observations is obtained.

The wireless clustering module 122 may use the ϵ-distance for direct control over signal coverage of a wireless cluster. However, in spaces where dense wireless signal observations exist, the use of the DBSCAN process may tend to continuously stretch itself and create over-grown wireless clusters in that the distance between wireless signal observations may exceed the ϵ-distance threshold. The wireless clustering module 122 may prune these wireless signal observations violating signal coverage constraint from a DBSCAN cluster and use the resulting subset as a wireless cluster. For each DBSCAN cluster found, the wireless clustering module 122 may elect a signal centroid under three criteria in descending priority: 1) a turn observation and a core, 2) largest ϵ-neighborhood, and 3) minimal average distance to all other wireless signal observations. Any wireless signal observations that have a signal distance to signal centroid over ϵ-distance may be excluded and returned to an unexplored set for further examination. To minimize unnecessary wireless cluster merge and oscillation, during the iterative search, if a given wireless signal observation is recruited by another existing wireless cluster, the wireless clustering module 122 may re-admit the given wireless signal observation to a current wireless cluster if the given wireless signal observation has a smaller distance to the centroid of the current wireless cluster as opposed to the existing wireless cluster. Further, by choosing an appropriate ϵ-distance parameter, the signal coverage of wireless clusters may be effectively controlled.

For the wireless clustering module 122, the minPts parameter does not directly affect the signal coverage, but influences the wireless cluster size. For example, low minPts may tend to create more sparsely populated wireless clusters, whereas dense wireless clusters may emerge if a high minPts is employed. Generally, a wireless cluster with smaller membership of wireless signal observations may be more compact in terms of both signal coverage and physical coverage. Further, fewer wireless signal observations may mean that a wireless cluster has limited contribution to the subsequent PDR displacement fusion process.

For the wireless clustering module 122, physical coverage of clusters may be controlled by indirectly manipulating the ϵ-distance and minPts parameters. Physical coverage may be represented by two error indicators, namely, centroid offset error and cluster radius error. The centroid offset error may signify the extent of how a wireless cluster deviates from its corresponding reference locations by calculating the discrepancy between a physical centroid of a resulting wireless cluster and the actual location the centroid is supposed to represent. The wireless cluster radius error may define the coverage of a wireless cluster by calculating the average distance from wireless signal observations to the wireless cluster centroid. The ϵ-distance and minPts parameters may jointly influence the physical coverage such that wireless clusters with erroneously large physical coverage may be avoided by choosing a small ϵ-distance. Further, wireless clusters with large error may have a relatively small wireless signal observation membership that is below average membership strongly correlated to the minPts parameter. These aspects may provide a manner in which to further reduce the potential wireless clustering error by adaptively adjusting minPts according to data amount and specifying a minimal membership threshold of wireless signal observations to distill large, stable wireless clusters.

Referring to FIG. 1, the PDR displacement vector estimation module 124, according to an example, is described.

Once the wireless clustering module 122 identifies wireless clusters at various locations, the PDR displacement vector estimation module 124 may identify connections linking the wireless clusters by identifying PDR traces going through the wireless clusters. When collected, each wireless signal observation by the wireless module 108 may be linked to the time instance in the corresponding PDR trace. Given a wireless cluster, the PDR displacement vector estimation module 124 may examine its membership of wireless signal observations and their associated PDR trace one by one. For a given PDR trace, if the PDR displacement vector estimation module 124 can find another point of PDR trace for which the binding wireless signal observation belongs to another wireless cluster, the PDR segment (i.e., PDR trace, or part of PDR trace) between these two points may be considered as one connection between two wireless clusters and translated into a PDR displacement vector. After all of the wireless signal observations are accounted for, the PDR displacement vector estimation module 124 may check for possible redundant PDR segments between same pairs of wireless clusters, and may fuse any redundant PDR segments into a single PDR displacement vector by averaging the distances and angles if available. With respect to extraction of displacement from a PDR trace, the PDR displacement vector estimation module 124 may use step counting and frequency-based stride length estimation. The PDR displacement vector estimation module 124 may pass the magnitude of an acceleration trace from the accelerometer 114 into a low-pass filter to remove high frequency noise that cannot be associated with steps. Further, the PDR displacement vector estimation module 124 may calculate the derivative of the resulting output and indicate when the value of the derivative reverses from positive to negative to thus suggest a local maximum (i.e., a step). The PDR displacement vector estimation module 124 may also use a frequency-based stride length estimation model to determine the linear relation between stride length and step frequency as follows:

$$\text{stride} = a \times \text{freq}_{step} + b \qquad \text{Equation (2)}$$

For Equation (2), the linear coefficients a and b may be trained as personalized constants prior to implementation of the stride length estimation model With respect to a turning angle of a turn, an angle reference may be used to facilitate navigation. For any sample in a PDR segment that includes a compass reading (i.e., reading from the magnetometer 116), the angle reference may be added to this PDR segment. If a relatively large conflicting compass reading appears in a PDR segment, this may suggest an undetected turn or magnetic turbulence. Such a PRD segment may be temporarily removed until additional data received can confirm the existence of a missed turn. When multiple PDR segments are fused into one PDR displacement vector connecting two wireless clusters, all available angle references may also be averaged to represent the direction of the PDR displacement vector.

Figure 5:
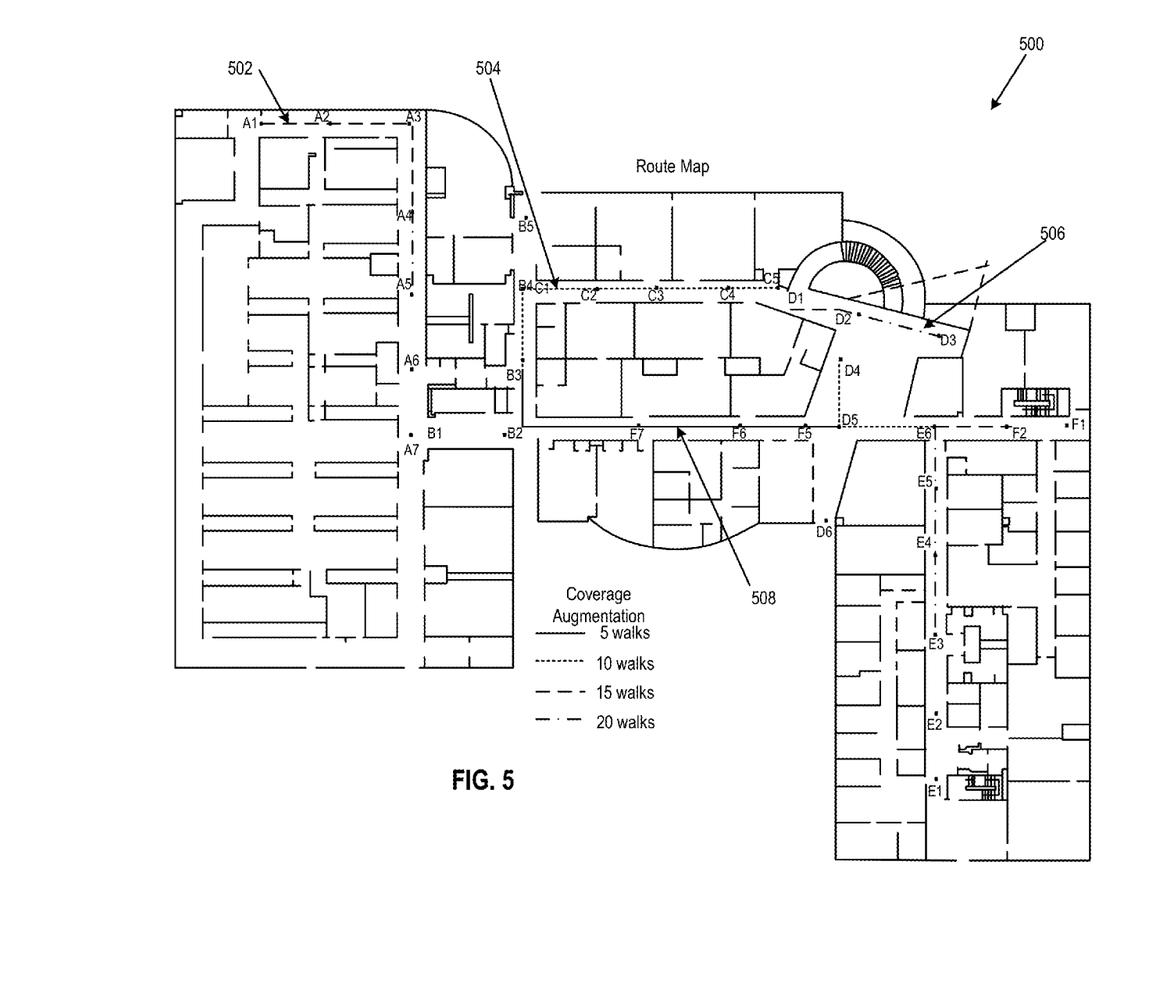
FIG. 5 illustrates an example of a floor plan for data collection and wireless clusters with varying data amount for the signal space based navigation apparatus of FIGS. 1 and 2, according to an example of the present disclosure.
Figure 6:
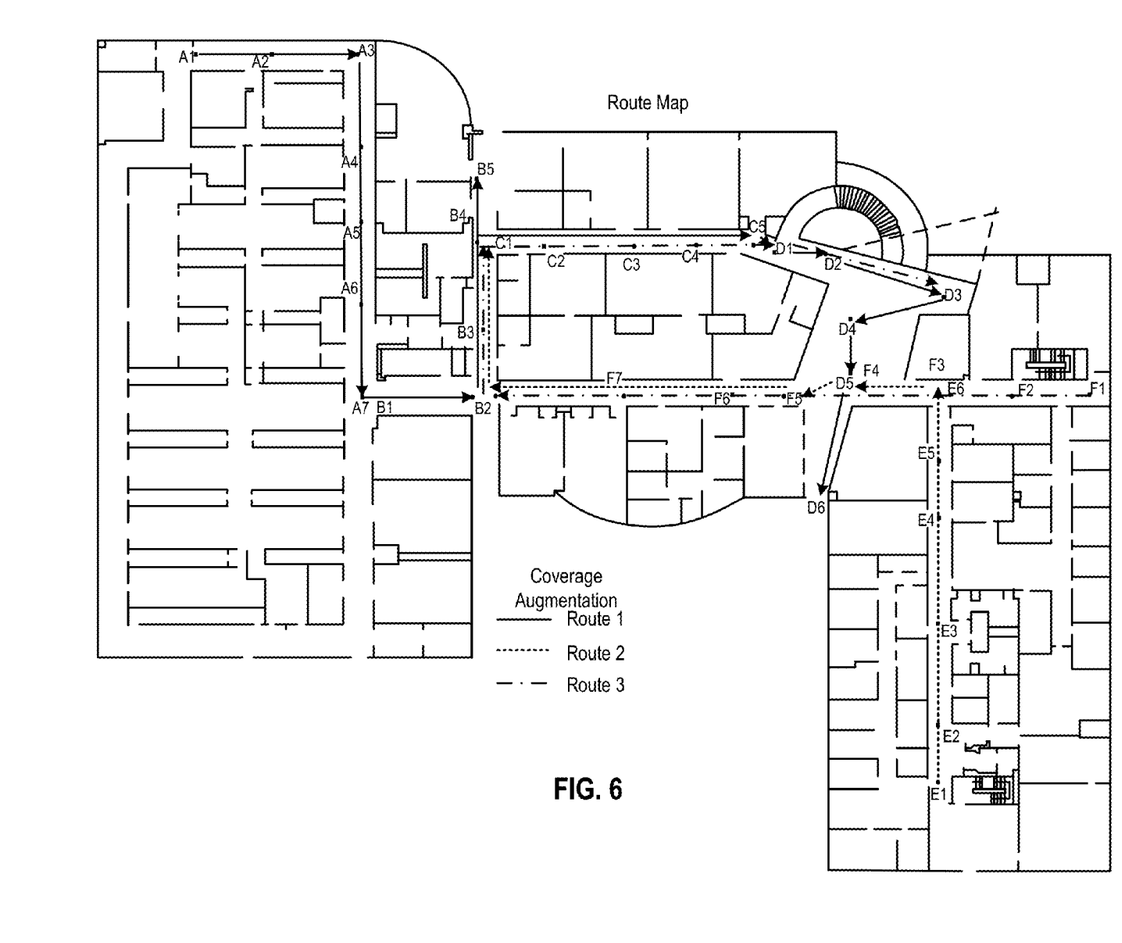
FIG. 6 illustrates an example of the floor plan of FIG. 5 for data collection and wireless clusters, illustrating PDR displacement vectors for the signal space based navigation apparatus of FIGS. 1 and 2, according to an example of the present disclosure.

FIG. 5 illustrates an example of a floor plan 500 for data collection and wireless clusters with varying data amounts for the signal space based navigation apparatus 100, according to an example of the present disclosure. The floor plan 500 illustrates wireless clusters detected, for example, at locations A1-A7, B1-B5, C1-C5, D1-D5, E1-E5, F1, and F2, and PDR displacement vectors between the wireless clusters as bold lines. The various walks that are performed by users are also illustrated at 502, 504, 506, and 508, superimposed on the PDR displacement vectors (see FIG. 6, PDR displacement vectors shown as arrows). Generally, relatively large wireless clusters may indicate a higher probability that these wireless clusters can be connected by fused PDR segments, and a relatively high number of large wireless clusters may further suggest higher coverage of the space. As shown in FIG. 5, coverage may be augmented (e.g., at 502, 504, 506, and 508) as more large wireless clusters are found and connected due to the increasing amount of data used.

The overall accuracy of the sensing map 112 may be determined based on error from wireless clustering with respect to the wireless clustering module 122 and error from PDR displacement estimation with respect to the PDR displacement vector estimation module 124. As discussed above, wireless clustering error may signify signal-spatial correlation, and may be used to determine the association between navigation waypoints and user perception. As discussed above, the wireless clustering error may be quantified based on wireless cluster centroid offset and wireless cluster radius. PDR displacement estimation error that affects guidance provided to the user via the route planning module 126 may result, for example, from noisy inertia sensor readings (e.g., readings from the accelerometer 114). With respect to PDR displacement estimation error, the signal space based navigation apparatus 100 may measure the displacement differences in distance and direction between the estimated PDR displacement and the ground connecting two wireless cluster represented locations, accounting for the aggregated effect of both wireless clustering and PDR estimation error. PDR displacement estimation error may be reduced, for example, by increasing the number of PDR segments between wireless clusters for fusing. Further, PDR displacement estimation error may be reduced, for example, by implementing higher density for the wireless clusters with shorter distance between each wireless cluster. The separation of a relatively long path into a number of small segments with less PDR displacement error may allow frequent recalibration during a navigation task.

With respect to PDR directions for fused segments, due to possible distortion caused by indoor magnetic field turbulence, the absolute value reported by fused direction may have limited usability in a navigation task. However, relatively high consistency may be observed throughout training walks, which may suggest that a fused direction may be used to provide a coarse clue for adjusting an initial heading and determining whether a user is on the correct path. In the case of intersection for example, a user may distinguish paths originated from the same point at the intersection by comparing a current direction reading with a fused direction associated with PDR segments originated from the corresponding starting cluster.

In order to minimize energy consumption of the user devices 102, scans by the sensing module 118 may be prioritized at turn locations (e.g., at a higher sampling rate), compared to scans at other intermediate locations (e.g., at a lower sampling rate). The sensing module 118 may also perform turn detection using acceleration traces by the accelerometer 114, to thus avoid frequent sampling by the magnetometer 116.

During initial deployment of the signal space based navigation apparatus 100, when the number of wireless clusters may be limited, a user may not be located adjacent a wireless cluster that is close to the user's current location. In this case, the signal space based navigation apparatus 100 may provide a navigation indication by resorting to more densely present leaf wireless fingerprints dispersed over a space. The leaf wireless fingerprints may include a plurality of wireless signal observations, without forming a wireless cluster. While such leaf wireless fingerprints have not been recruited in a wireless cluster, such leaf wireless fingerprints may nevertheless establish a viable PDR segment connecting them to wireless clusters. Thus, a user may locate nearby leaf wireless fingerprints and may follow the emitting PDR of such leaf wireless fingerprints to reach the nearest wireless cluster. In this manner, wireless cluster density may grow as the amount of the traces 104 increases, and thus after an initial wireless cluster generation stage, the user may expect to reach nearby wireless clusters with confidence.

Figure 7:
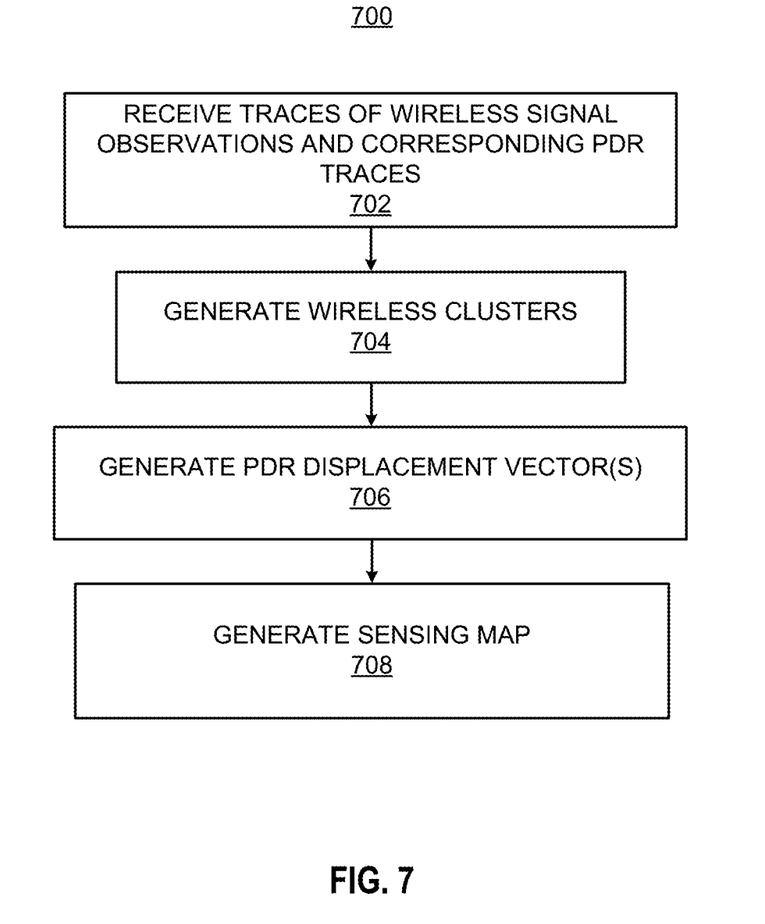
FIG. 7 illustrates a method for signal space based navigation, according to an example of the present disclosure.
Figure 8:
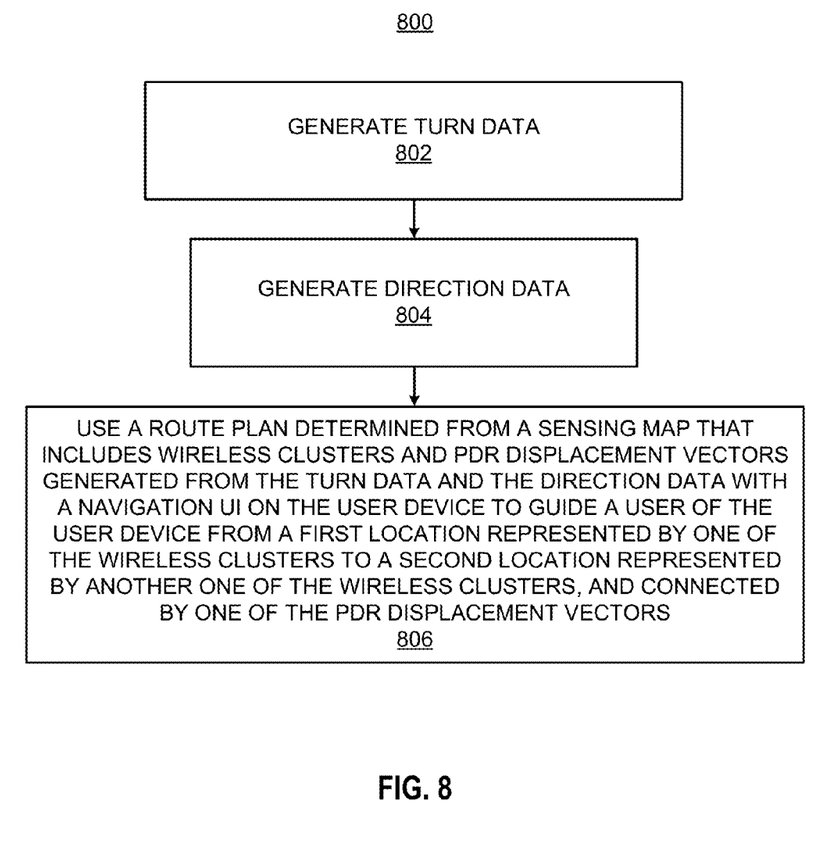
FIG. 8 illustrates further details of the method for signal space based navigation, according to an example of the present disclosure.

FIGS. 7 and 8 respectively illustrate flowcharts of methods 700 and 800 for signal space based navigation, corresponding to the example of the signal space based navigation apparatus 100 whose construction is described in detail above. The methods 700 and 800 may be implemented on the signal space based navigation apparatus 100 with reference to FIGS. 1-6 by way of example and not limitation. The methods 700 and 800 may be practiced in other apparatus.

Referring to FIG. 7, for the method 700, at block 702, the method may include receiving traces of wireless signal observations and corresponding PDR traces between different ones of the wireless signal observations from a plurality of user devices. For example, referring to FIG. 2, the signal space based navigation apparatus 100 may receive the traces 104 of wireless signal observations and corresponding PDR traces between different ones of the wireless signal observations from a plurality of user devices 102. According to an example, the traces of wireless signal observations and corresponding PDR traces may include turn-aware crowd-sourced data (e.g., the traces 104).

At block 704, the method may include generating a plurality of wireless clusters based on the traces of wireless signal observations. For example, referring to FIG. 2, the wireless clustering module 122 may generate a plurality of wireless clusters based on the traces 104 of wireless signal observations (e.g., see FIG. 5). According to an example, generating a plurality of wireless clusters based on the traces 104 of wireless signal observations may further include grouping the wireless signal observations based on a predetermined level of signal similarity. According to an example, generating a plurality of wireless clusters based on the traces 104 of wireless signal observations may further include controlling physical coverage of the plurality of wireless clusters by analyzing a wireless cluster centroid offset error and wireless cluster radius error for each of the plurality of wireless clusters.

At block 706, the method may include generating a PDR displacement vector between two or more of the wireless clusters based on the two or more of the wireless clusters and a subset of the PDR traces corresponding to the two or more of the wireless clusters. For example, referring to FIG. 2, the displacement vector estimation module 124 may generate a PDR displacement vector between two or more of the wireless clusters based on the two or more of the wireless clusters and a subset of the PDR traces corresponding to the two or more of the wireless clusters. According to an example, generating a PDR displacement vector between two or more of the wireless clusters based on the two or more of the wireless clusters and a subset of the PDR traces corresponding to the two or more of the wireless clusters may further include identifying and fusing the subset of the PDR traces corresponding to the two or more of the wireless clusters to determine relative positions of the two or more of the wireless clusters.

At block 708, the method may include generating a sensing map based on the wireless clusters and a plurality of PDR displacement vectors including the PDR displacement vector. For example, referring to FIG. 2, the sensing map 112 may be generated based on the wireless clusters and a plurality of PDR displacement vectors including the PDR displacement vector.

For the method 700 described above, the plurality of wireless clusters may include a plurality of WiFi clusters. According to a further example, the method may include using the sensing map 112 for route planning (i.e., by the route planning module 126) to guide a user from a first location represented by one of the WiFi clusters to a second location represented by another one of the WiFi clusters, and connected by one of the plurality of PDR displacement vectors. According to a further example, the method may include guiding the user from the first location to the second location via an intermediate location represented by a further one of the WiFi clusters.

Referring to FIG. 8, for the method 800, at block 802, the method may include generating turn data based on detection of a change of mobility of a user device at a turn in movement of the user device. For example, referring to FIGS. 1 and 2, the turn detection module 120 may detect (in conjunction with the accelerometer 114) a change of mobility of a user device 102 at a turn in movement of the user device 102 to generate turn data. According to an example, the user device may include an accelerometer, and generating turn data based on detection of a change of mobility of a user device at a turn in movement of the user device may further include detecting the change of mobility of the user device at a turn based upon a condition detected by the accelerometer. According to an example, generating turn data based on detection of a change of mobility of a user device at a turn in movement of the user device may further include evaluating an energy spectrum related to up-down movements of the user device relative to a generally horizontal plane, and identifying a frequency at which a maximum energy is observed as a turn. According to an example, generating turn data based on detection of a change of mobility of a user device at a turn in movement of the user device may further include isolating a sideways PDR trace segment of a predetermined length from PDR traces related to non-sideways movements of the user device, and using the isolated sideways PDR trace segment to detect a turn.

At block 804, the method may include generating direction data based on detection of a direction of the mobility of the user device. For example, referring to FIGS. 1 and 2, the magnetometer 116 may detect a direction of the mobility of the user device 102 to generate direction data.

At block 806, the method may include using a route plan determined from a sensing map (i.e., the sensing map 112) that includes wireless clusters and PDR displacement vectors generated from the turn data and the direction data with a navigation UI (i.e., the navigation UI 110) on the user device 102 to guide a user of the user device 102 from a first location represented by one of the wireless clusters to a second location represented by another one of the wireless clusters, and connected by one of the PDR displacement vectors.

For the method 800 described above, according to a further example, the user device may include an accelerometer, the method may include using the accelerometer as a trigger at the turn for performance of wireless signal observations at a higher sampling rate compared to non-turn locations.

Figure 9:
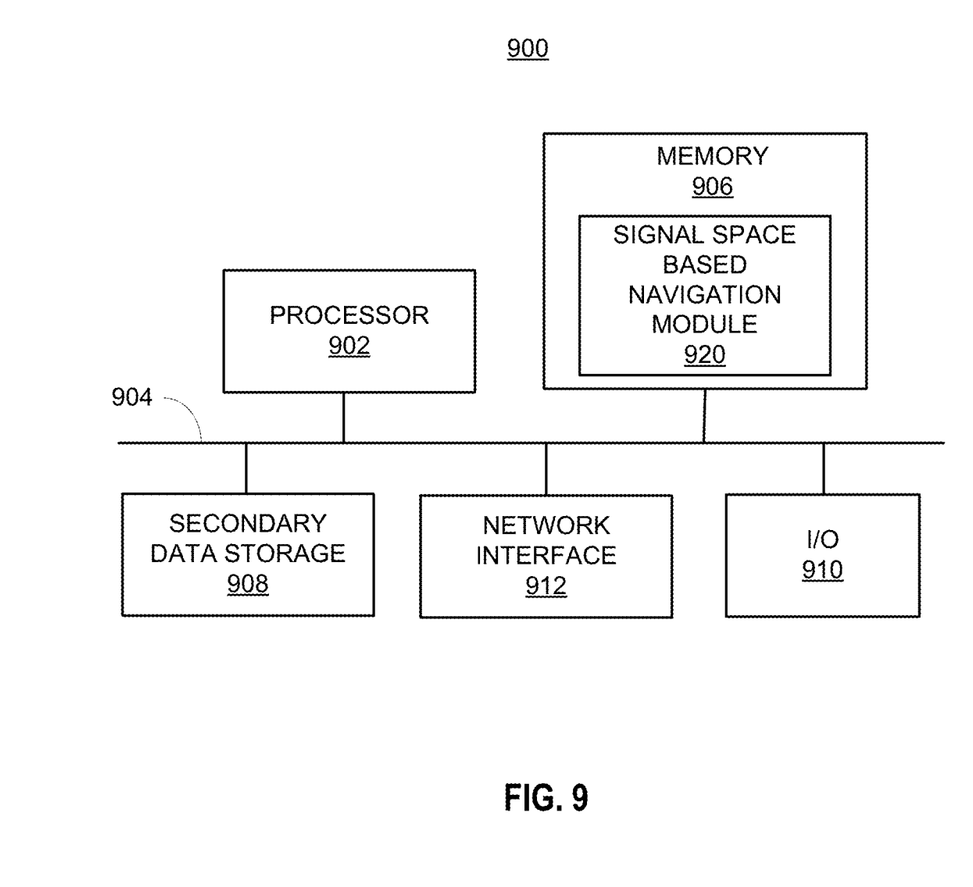
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as a platform for the apparatus 100. The computer system 900 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include a signal space based navigation module 920 including machine readable instructions residing in the memory 906 during runtime and executed by the processor 902. The signal space based navigation module 920 may include the modules of the apparatus 100 shown in FIGS. 1 and 2.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A signal space based navigation apparatus comprising:
a processor; and
a memory storing machine readable instructions that when executed by the processor cause the processor to:
receive traces of wireless signal observations and corresponding pedestrian deadreckoning (PDR) traces between different ones of the wireless signal observations from a plurality of user devices;
generate a plurality of wireless clusters based on the traces of wireless signal observations;
generate a PDR displacement vector between at least two of the wireless clusters based on the at least two of the wireless clusters and a subset of the PDR traces corresponding to the at least two of the wireless clusters; and
generate a sensing map based on the plurality of wireless clusters and a plurality of PDR displacement vectors including the PDR displacement vector.

2. The signal space based navigation apparatus according to claim 1, wherein the plurality of wireless clusters include a plurality of WiFi clusters, further comprising machine readable instructions to cause the processor to:
use the sensing map for route planning to guide a user from a first location represented by one of the plurality of WiN clusters to a second location represented by another one of the plurality of WiFi clusters, and connected by one of the plurality of PDR displacement vectors.

3. The signal space based navigation apparatus according to claim 2, further comprising machine readable instructions to cause the processor to:
guide the user from the first location to the second location via an intermediate location represented by a further one of the plurality of WiFi clusters.

4. The signal space based navigation apparatus according to claim 1, wherein the traces of wireless signal observations and corresponding PDR traces include turn-aware crowd-sourced data.

5. The signal space based navigation apparatus according to claim 1, wherein to generate the plurality of wireless clusters based on the traces of wireless signal observations, the machine readable instructions are further to cause the processor to:
generate the plurality of wireless clusters based on density-based WiFi observation clustering.

6. The signal space based navigation apparatus according to claim 1, wherein to generate the plurality of wireless clusters based on the traces of wireless signal observations, the machine readable instructions are further to cause the processor to:
group the wireless signal observations based on a predetermined level of signal similarity.

7. The signal space based navigation apparatus according to claim 1, wherein to generate the plurality of wireless clusters based on the traces of wireless signal observations, the machine readable instructions are further to cause the processor to:
control physical coverage of the plurality of wireless clusters by analyzing a wireless cluster centroid offset error and wireless cluster radius error for each of the plurality of wireless clusters.

8. The signal space based navigation apparatus according to claim 1, wherein to generate the PDR displacement vector between at least two of the wireless clusters based on the at least two of the wireless clusters and the subset of the PDR traces corresponding to the at least two of the wireless clusters, the machine readable instructions are further to cause the processor to:
identity and fuse the subset of the PDR traces corresponding to the at least two of the wireless clusters to determine relative positions of the at least two of the wireless clusters.

9. A method for signal space based navigation, the method comprising:
generating turn data based on detection of a change of mobility of a user device at a turn in movement of the user device;
generating direction data based on detection of a direction of the mobility of the user device; and
using, by a processor, a route plan determined from a sensing map that includes wireless clusters and pedestrian deadreckoning (PDR) displacement vectors generated from the turn data and the direction data with a navigation user interface (UI) on the user device to guide a user of the user device from a first location represented by one of the wireless clusters to a second location represented by another one of the wireless clusters, and connected by one of the PDR displacement vectors.

10. The method of claim 9, wherein the user device comprises an accelerometer and wherein generating turn data based on detection of the change of mobility of the user device at the turn in movement of the user device, further comprises:
detecting the change of mobility of the user device at the turn based upon a condition detected by the accelerometer.

11. The method of claim 9, wherein the user device comprises an accelerometer, the method further comprising:
using the accelerometer as a trigger at the turn for performance of wireless signal observations at a higher sampling rate compared to non-turn locations.

12. The method of claim 9, wherein generating turn data based on detection of the change of mobility of the user device at the turn in movement of the user device further comprises:
evaluating an energy spectrum related to up-down movements of the user device relative to a generally horizontal plane; and
identifying a frequency at which a maximum energy is observed as the turn.

13. The method of claim 9, wherein generating turn data based on detection of the change of mobility of the user device at the turn in movement of the user device further comprises:
isolating a sideways PDR trace segment of a predetermined length from PDR traces related to non-sideways movements of the user device; and
using the isolated sideways PDR trace segment to detect the turn.

14. The method of claim 9, wherein the user device comprises a smartphone.

15. A non-transitory computer readable medium having stored thereon machine readable instructions to provide signal space based navigation, the machine readable instructions, when executed, cause a computer system to:

receive crowd-sourced traces of WiFi signal observations and corresponding pedestrian deadreckoning (PDR) traces between different ones of the WiFi signal observations from a plurality of user devices;

generate a plurality of WiFi clusters based on the crowd-sourced traces of WiFi signal observations, wherein a WiFi cluster is confined in an area of a predetermined WiFi signal coverage and predetermined physical coverage;

generate a PDR displacement vector between at least two of the WiFi clusters based on the at least two of the WiFi clusters and a subset of the PDR traces corresponding to the at least two of the WiFi clusters;

generate, by a processor, a sensing map based on the plurality of WiFi clusters and a plurality of PDR displacement vectors including the PDR displacement vector; and use the sensing map for route planning to guide a user from a first location represented by one of the plurality of WiFi clusters to a second location represented by another one of the plurality of WiFi clusters, and connected by one of the plurality of PDR displacement vectors.

16. The non-transitory computer readable medium according to claim 15, further comprising machine readable instructions to cause the computer system to:

guide the user from the first location to the second location via an intermediate location represented by a further one of the plurality of WiFi clusters.

17. The non-transitory computer readable medium according to claim 15, wherein to generate the plurality of WiFi clusters based on the crowd-sourced traces of WiFi signal observations, the machine readable instructions further cause the computer system to:

generate the plurality of WiFi clusters based on density-based WiFi observation clustering.

18. The non-transitory computer readable medium according to claim 15, wherein to generate the plurality of WiFi clusters based on the crowd-sourced traces of WiFi signal observations, the machine readable instructions further cause the computer system to:

group the WiFi signal observations based on a predetermined level of signal similarity.

19. The non-transitory computer readable medium according to claim 15, wherein to generate the plurality of WiFi clusters based on the traces of WiFi signal observations, the machine readable instructions further cause the computer system to:

control physical coverage of the plurality of WiFi clusters by analyzing a WiFi cluster centroid offset error and WiFi cluster radius error for each of the plurality of WiFi clusters.

20. The non-transitory computer readable medium according to claim 15, wherein to generate the PDR displacement vector between the at least two of the WiFi clusters based on the at least two of the WiFi clusters and the subset of the PDR traces corresponding to the at least two of the WiFi clusters, the machine readable instructions further cause the computer system to:

identity and fuse the subset of the PDR traces corresponding to the at least two of the WiFi clusters to determine relative positions of the at least two of the WiFi clusters.

* * * * *